Dec. 25, 1956 J. J. BALINT ET AL 2,775,479
OPERATING APPARATUS FOR A VEHICLE WINDOW
Filed Nov. 16, 1953 6 Sheets-Sheet 3

INVENTORS
Julius J. Balint,
Gilbert G. Bannasch &
BY David H. Bratton
Paul Fitzpatrick
ATTORNEY Dec. 25, 1956     J. J. BALINT ET AL     2,775,479
OPERATING APPARATUS FOR A VEHICLE WINDOW
Filed Nov. 16, 1953     6 Sheets-Sheet 4
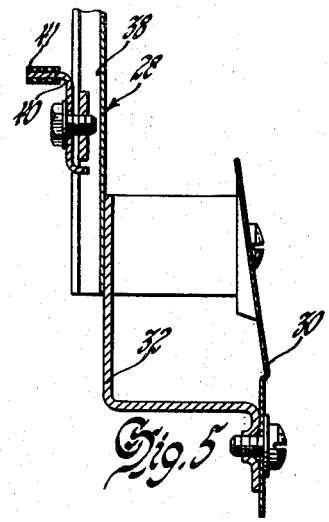
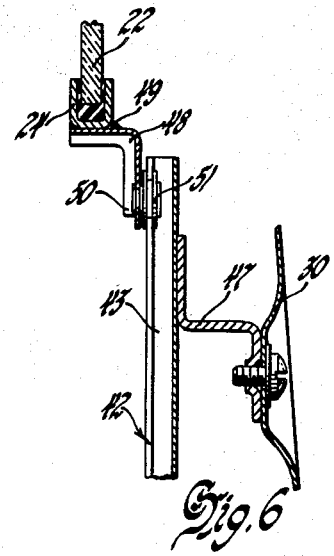
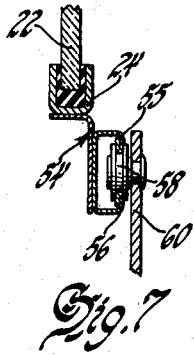
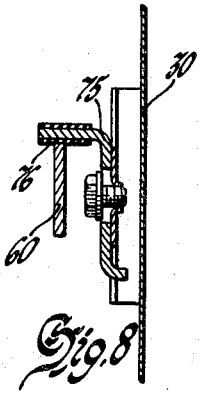
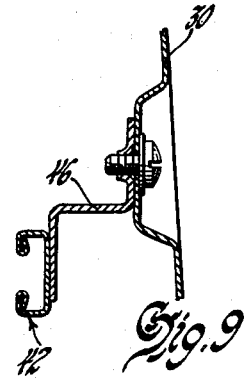
INVENTORS
Julius J. Balint,
Gilbert C. Bannasch &
BY David H. Bratton
Paul Fitzpatrick
ATTORNEY

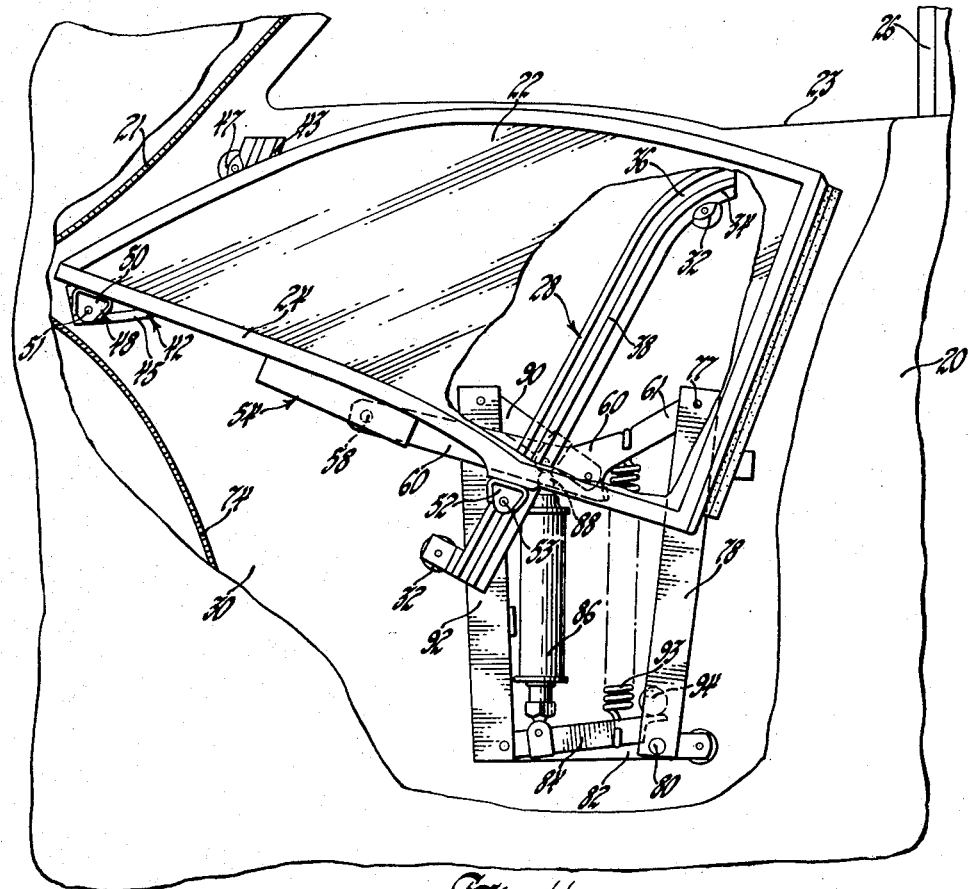

United States Patent Office 2,775,479
Patented Dec. 25, 1956

2,775,479

OPERATING APPARATUS FOR A VEHICLE WINDOW

Julius J. Balint and Gilbert A. Bannasch, Detroit, and David H. Bratton, Berkley, Mich., assignors to General Motors Corporation, Detroit, Mich., a corporation of Delaware Application November 16, 1953, Serial No. 392,144

11 Claims. (Cl. 296—44)

This invention relates to operating apparatus for a vehicle window, and more particularly to operating apparatus for the rear quarter window of an automobile.

In most contemporary automobile coupes the rear quarter window is lowered by rotating it about a pivot located adjacent the lower front corner of the window. However, if the automobile body is so designed that the rear quarter window is longer than it is in these contemporary coupe models, the window can no longer be lowered by this means because of interference with the rear wheel housing. For the same reason, the window cannot be lowered in a straight line from its closed position. The invention provides an improved window operating apparatus, wherein the window is lowered bodily along curved guide tracks so arranged that the window first moves rearwardly to provide a small opening at the front and then moves bodily downwardly and rearwardly, the front end of the window moving farther than does the rear end of the window so that when in fully lowered position the window lies completely below the window opening despite the relatively small available space above the wheel housing. The operating apparatus of the present invention may be actuated by any conventional means, as a hydraulic or other fluid actuator, an electric actuator, or a manual crank device on the inside of the passenger compartment.

Other features and advantages of the invention will be apparent from the following description and from the drawings, in which:

Fig. 5 is a section through the lower portion of the front guide track, being taken along the line 5—5 of Fig. 1;

Fig. 6 is a section through the upper portion of the rear guide track, being taken along the line 6—6 of Fig. 1;

Fig. 7 is a section through the actuating arm and the associated window frame bracket, being taken along the line 7—7 of Fig. 4;

Fig. 8 is a transverse section through the actuating arm and the stop means therefor, being taken along the line 8—8 of Fig. 4;

Fig. 9 is a transverse section through the lower portion of the rear guide track, being taken along the line 9—9 of Fig. 1;

Fig. 11 is a view similar to Fig. 10, but showing the window in lowered position;

Fig. 12 is a detail section taken along the line 12—12 of Fig. 10; and

Fig. 13 is a detail section taken along the line 13—13 of Fig. 10.

Referring now more particularly to the drawings, the rear quarter portion of an automobile coupe is shown in Figs. 1–4, this portion of the automobile comprising a rear quarter outer panel 20, which is partly broken away in said figures, and a roof panel 21 which slopes downwardly and rearwardly to form the rear deck of the automobile.

Figure 1:
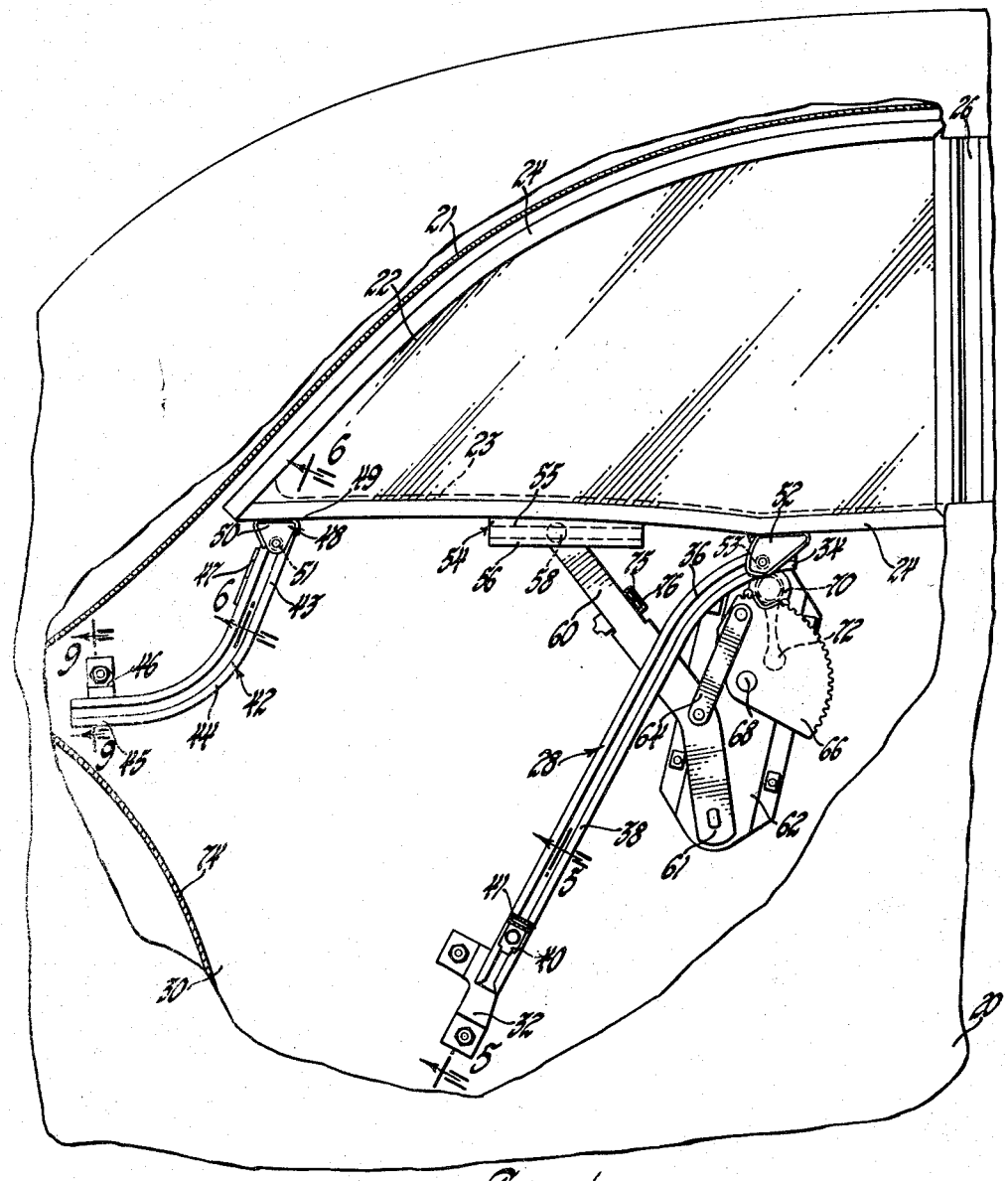
Fig. 1 is a fragmentary side elevation of the rear quarter portion of an automobile coupe, the window being closed and outer body panel being broken away to show the window operating apparatus.
Figure 3:
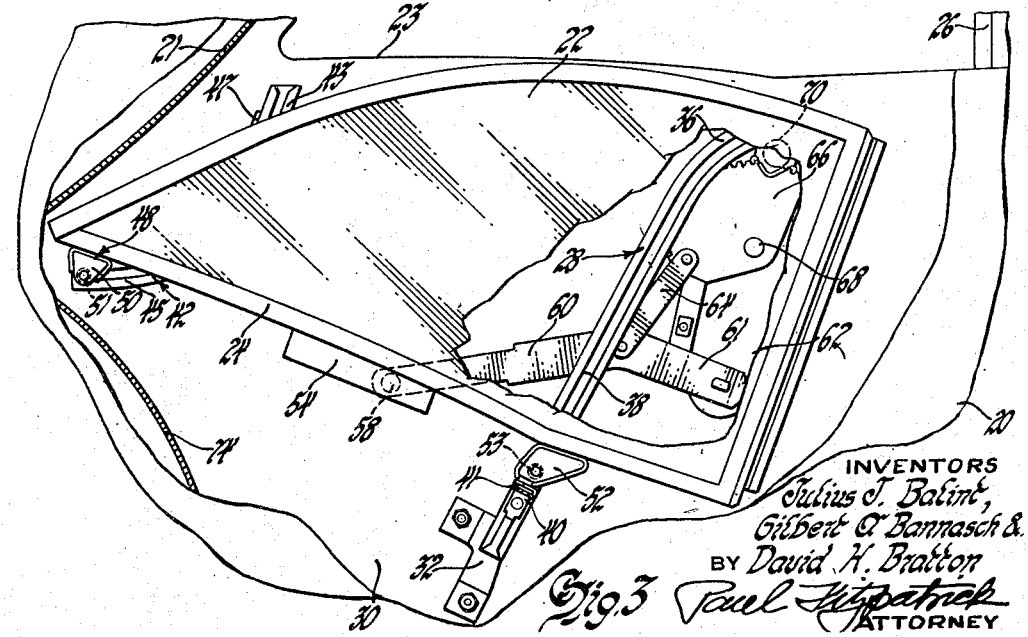
Fig. 3 is a view similar to Fig. 1, the window being shown fully lowered.
Figure 4:
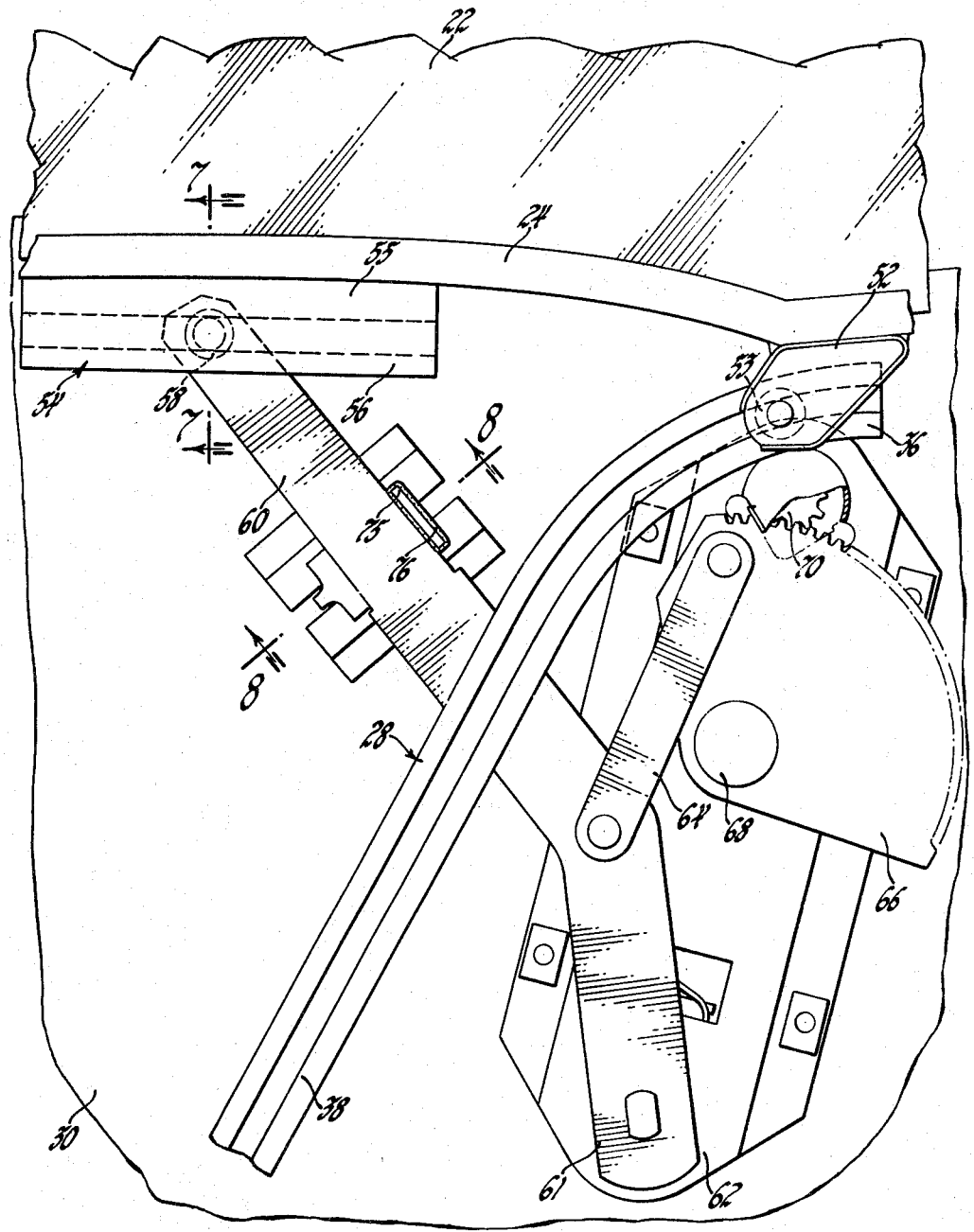
Fig. 4 is an enlarged view of a portion of the actuating means shown in Fig. 1.
Figure 10:
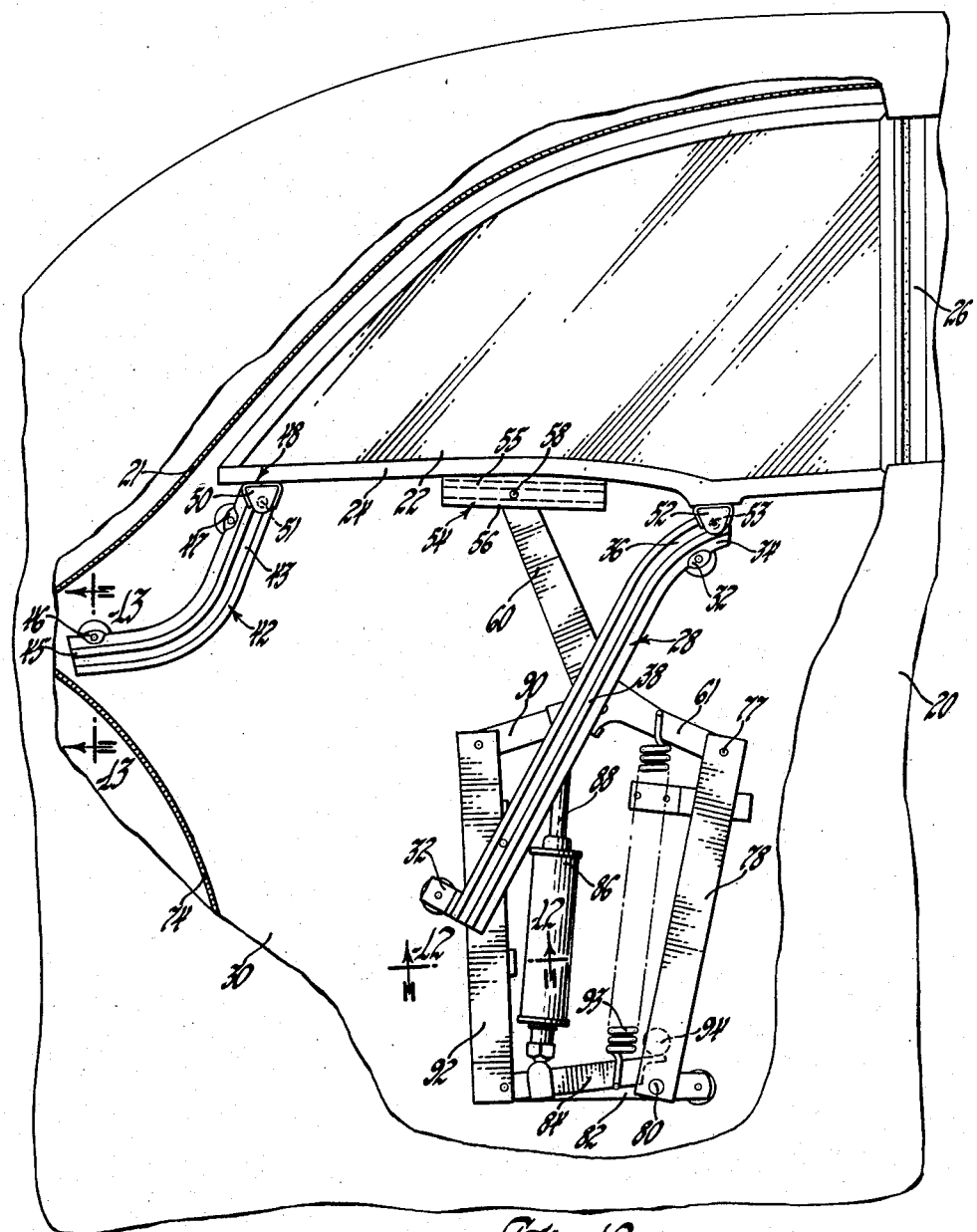
Fig. 10 is a side elevational view similar to Fig. 1, but showing a modified form of actuating means.

A generally triangular rear quarter window 22 is mounted in a window opening 23 in the automobile body and is movable between the closed position of Fig. 1 and the open position of Fig. 3. The window is carried in a peripheral frame 24 which, when the window is closed, seals against the roof 21 at the top and rear and seals against the rear edge 26 of the front window of the automobile.

In order to move the window 22 from the closed position of Fig. 1 to the open position of Fig. 3, guide means are provided comprising a front guide track, designated generally as 28, which is mounted on the inner quarter panel 30 by means of mounting brackets 32. The track 28 has a forward generally horizontal upper portion 34 which merges into a rearwardly and downwardly curved intermediate portion 36, which in turn merges into a straight generally vertical lower portion 38 which extends downwardly and rearwardly and is secured at its lower end to the bracket 32. As shown best in Fig. 5, 40 is a stop bracket which is bolted to the lower end of the track to provide a stop for the actuating arm to be hereinafter described. The bracket 40 is covered with a rubber sleeve 41.

A curved rear guide track, designated generally as 42, has a straight downwardly and rearwardly extending upper portion 43, a curved intermediate portion 44 and a rearwardly extending generally horizontal lower portion 45. The straight portions 38 and 43 of the front and rear tracks 28 and 42 converge, and the rear track 42 is shorter than the front track 28 so that the lower portion 45 of the rear track is at a higher level than the lower end of the front track. The rear track 42 is secured to the inner quarter panel 30 by brackets 46 and 47.

Means are provided for connecting the frame 24 to the front and rear tracks for movement therealong. The frame is connected to the rear track by a connecting bracket 48 (Figs. 1, 2, 3 and 6) which is welded at 49 to the frame 24 and which has a downwardly extending flange 50 upon which is mounted a roller 51, this roller riding in the track 42. At the front a similar connecting bracket 52 is welded to the underside of the window frame 22 and carries a roller 53 which rides in the front track 28.

Figure 2:
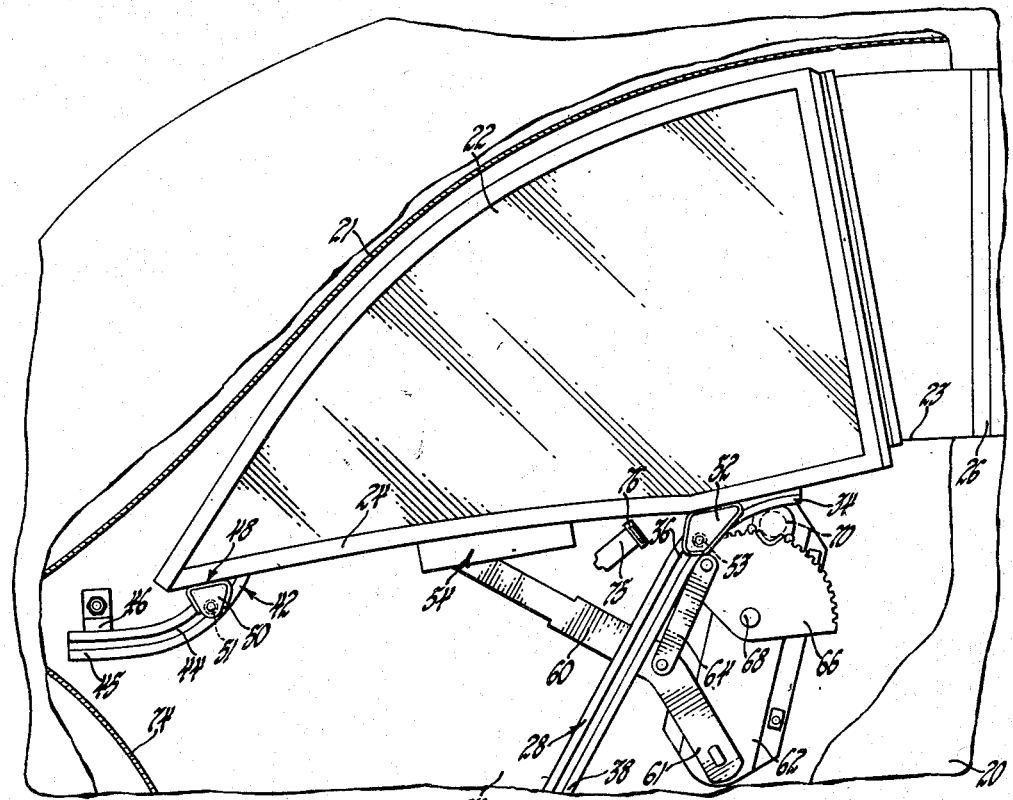
Fig. 2 is a view similar to Fig. 1, the window being shown partially lowered.

In order to move the window along the guide tracks, a bracket 54 is mounted on the underside of the frame 24 intermediate the two tracks, this bracket being channel shaped with flanges 55 and 56 forming a generally horizontal track in which rides a roller 58 which is carried on the end of an operating arm 60. This arm is formed as a dog's leg, and its lower end 61 is pivoted on a support bracket 62 which is bolted to the panel 30. Intermediate the ends of the arm 60, and adjacent the juncture of the two angular portions thereof, is articulated a link 64, the other end of which is pivotally connected to a gear sector 66 near the periphery thereof. Gear 66 is pivoted at 68 on the support bracket 62, and the sector 66 meshes with a pinion 70 which may be driven by manual, electrical or other means to move the window 22 between closed and open positions. In Fig. 1, a crank 72 is shown mounted inside the passenger compartment. If this crank is turned to rotate the pinion 70 in a clockwise direction, the sector 66 will rotate in a counterclockwise direction, driving the operating arm 60 in a counterclockwise direction until the window is fully lowered, at which time the bracket 52 will abut the rubber covered stop 40. As this opening movement commences, the rear end of the window moves downwardly and rearwardly along the straight portion 43 of track 42, while the front end of the window moves rearwardly along the generally horizontal portion 34 of the front track 28, so that a small opening is provided at the front edge of the window as shown in Fig. 2. As the opening continues, the front edge of the window moves through the downwardly curved intermediate portion 36 of the front track 28 and down the straight portion 38 thereof, while the rear edge of the window moves through the curved intermediate portion 44 and the generally horizontal portion 45 of the rear track 42. The window pivots about the axis of the rear roller 51 to permit the front end of the window to move to its fully lowered position (Fig. 3) where the bracket 52 strikes the stop 40.

This compound movement permits the window to be fully lowered and to be completely contained within the body of the automobile beneath the window opening 23 despite the presence of the wheel housing 74, which would prevent lowering the window in a straight line or in an arc about a fixed pivot at the front or rear of the window opening. The roller 58 moves in the track in the bracket 54 to prevent jamming throughout the range of this compound movement.

When the window is moved back to closed position, the crank 72 (Fig. 1) is turned in a counterclockwise direction to lift the actuating arm 60 and move the window back to closed position, the window pivoting about the axis of the rear roller 51 during the first portion of this movement. A rubber covered stop formed by a bracket 75 and rubber sleeve 76 limits closing movement of the window.

Figs. 10–13 show a modified form of actuating means. In these figures the operating arm 60 has one end pivotally connected at 77 to a support bar 78 which itself is articulated at 80 to a stationary frame member 82. A supporting link 84 is pivoted on the frame 82 and provides a mounting for a hydraulic piston and cylinder device 86, the piston rod 88 of which is connected to strap 90 which is pivoted at one end to a vertical support 92 and at the other end to the operating arm 60. The piston and cylinder device 86 is opposed by a strong spring 93 which is connected between the operating arm 60 and the supporting link 84, and a bumper 94 limits upward movement of the supporting link 84. The spring 93 is used to lower the window from the position of Fig. 10 to the position of Fig. 11, and the piston and cylinder device 86, which may be supplied with fluid in conventional manner, is used to raise the window. In this modification of the device, the relatively curved rear track 42 and the longer front track 28 are similar to the tracks described in Figs. 1–9 and the movement of the window is similar to that earlier described.

While we have shown and described two embodiments of our invention, it is capable of many modifications. Changes, therefore, in the construction and arrangement may be made without departing from the spirit and scope of the invention as set forth in the appended claims.

We claim:

1. Operating apparatus of the character described for a vehicle window, including: a window frame which seats in a window opening in the vehicle body when the window is closed; a front guide track on the body below said opening, said track having a forward generally horizontal upper portion and a downwardly and rearwardly extending lower portion; a curved rear guide track on the body below said opening; means connecting said frame to said tracks for movement therealong; and means for moving said frame along said tracks.

2. Operating apparatus of the character described for a vehicle window, including: a window frame which seats in a window opening in the vehicle body when the window is closed; a front guide track on the body below said opening, said track having a forward generally horizontal upper portion, a downwardly curved intermediate portion and a straight downwardly and rearwardly extending lower portion; a curved rear guide track on the body below said opening; means connecting said frame to said tracks for movement therealong; and means for moving said frame along said tracks.

3. Apparatus of the character claimed in claim 2, wherein the rear track is shorter than the front track, said window frame pivoting at the lower end of the rear track while continuing to move along the front track.

4. Operating apparatus of the character described for a window in a vehicle body having a window opening and a housing panel below said opening, including: a window frame which seats in the window opening when the window is closed; a front guide track on the body below said opening, said track having a forward generally horizontal upper portion and a downwardly and rearwardly extending lower portion forwardly of said panel; a curved rear guide track on the body below said opening, said rear track having an upper portion extending downwardly and rearwardly toward said panel and a rearwardly extending generally horizontal lower portion; means connecting said frame to said tracks for movement therealong; and means for moving said frame along said tracks.

5. Operating apparatus of the character described for a window in a vehicle body having a window opening and a housing panel below said opening, including: a window frame which seats in the window opening when the window is closed; a front guide track on the body below said opening, said track having a forward generally horizontal upper portion, a downwardly and rearwardly curved intermediate portion and a straight downwardly and rearwardly extending lower portion forwardly of said panel; a curved rear guide track on the body below said opening, said rear track being shorter than the front track and having a straight downwardly and rearwardly extending upper portion projecting toward said panel, a curved intermediate portion and a rearwardly extending generally horizontal lower portion above said panel; means connecting said frame to said tracks for movement therealong; and means for moving said frame along said tracks.

6. Apparatus of the character claimed in claim 5, wherein the lower portion of said rear track is located at a higher level than the lower end of said front track, said window pivoting at the lower end of the rear track while continuing to move along the front track.

7. Apparatus of the character claimed in claim 5, wherein the straight portions of said tracks converge.

8. Operating apparatus of the character described for a window in a vehicle body having a window opening and a wheelhousing below said opening, including: a window frame which seats in the window opening when the window is closed; a front guide track on the body below said opening, said track having a forward generally horizontal upper portion and a downwardly and rearwardly extending lower portion forwardly of said wheelhousing; a curved rear guide track on the body below said opening and above said wheelhousing; means connecting said frame to said tracks for movement therealong; a bracket mounted on said frame intermediate the front and rear tracks; and operating arm slidably connected to said bracket; and means for moving said arm to move said frame along said tracks.

9. Operating apparatus of the character described for a window in a vehicle body having a window opening and a wheelhousing below said opening, including: a window frame which seats in the window opening when the window is closed; a front guide track on the body below said opening, said track having a forward generally horizontal upper portion and a downwardly and rearwardly extending lower portion forwardly of said wheelhousing; a curved rear guide track on the body below said opening, said rear track having an upper portion extending downwardly and rearwardly toward said wheelhousing and a rearwardly extending generally horizontal lower portion above said wheelhousing; means connecting said frame to said tracks for movement therealong; a bracket mounted on said frame intermediate said front and rear tracks; a pivotally mounted operating arm slidably connected to said bracket; and means for mounting said arm to move said frame along said tracks.

10. Operating apparatus of the character described for a window in a vehicle body having a window opening and a wheelhousing below said opening, including: a window frame which seats in the window opening when the window is closed; a front guide track on the body below said opening, said track having a forward generally horizontal upper portion, a downwardly and rearwardly curved intermediate portion and a straight downwardly and rearwardly extending lower portion forwardly of said wheelhousing; a curved rear guide track on the body below said opening, said rear track being shorter than the front track and having a straight downwardly and rearwardly extending upper portion projecting toward said wheelhousing, a curved intermediate portion and a rearwardly extending generally horizontal lower portion above said wheelhousing; means connecting said frame to said tracks for movement therealong; a bracket mounted on said frame intermediate said front and rear tracks; a pivotally mounted operating arm slidably connected to said bracket; and means for pivoting said arm to move said frame along said tracks.

11. Operating apparatus of the character described for a window in a vehicle body having a window opening and a wheelhousing below said opening, including: a window frame which seats in the window opening when the window is closed; a front guide track on the body below said opening, said track having a forward generally horizontal upper portion, a downwardly and rearwardly curved intermediate portion and a straight downwardly and rearwardly extending lower portion forwardly of said wheelhousing; a curved rear guide track on the body below said opening, said rear track being shorter than the front track and having a straight downwardly and rearwardly extending upper portion projecting toward said wheelhousing and converging with the lower portion of the front track, a curved intermediate portion and a rearwardly extending generally horizontal lower portion above said wheelhousing, the lower portion of the rear track being located at a higher level than the lower end of said front track, said window frame pivoting at the lower end of the rear track while continuing to move along the front track; a bracket mounted on said frame intermediate said front and rear tracks; a pivotally mounted operating arm slidably connected to said bracket; and means for pivoting said arm to move said frame along said tracks.

References Cited in the file of this patent

UNITED STATES PATENTS

| | | |
|---|---|---|
| 2,298,515 | Sullivan | Oct. 13, 1942 |
| 2,651,541 | Surles | Sept. 8, 1953 |

FOREIGN PATENTS

| | | |
|---|---|---|
| 275,029 | Great Britain | Aug. 4, 1927 |